US012066712B2

(12) United States Patent
Liu et al.

(10) Patent No.: US 12,066,712 B2
(45) Date of Patent: Aug. 20, 2024

(54) DISPLAY PANEL AND DISPLAY DEVICE

(71) Applicant: Wuhan China Star Optoelectronics Technology Co., Ltd., Wuhan (CN)

(72) Inventors: Fancheng Liu, Wuhan (CN); Peng Zhang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/605,052

(22) PCT Filed: Sep. 13, 2021

(86) PCT No.: PCT/CN2021/117885
§ 371 (c)(1),
(2) Date: Mar. 2, 2023

(87) PCT Pub. No.: WO2023/024175
PCT Pub. Date: Mar. 2, 2023

(65) Prior Publication Data
US 2024/0019734 A1  Jan. 18, 2024

(30) Foreign Application Priority Data
Aug. 25, 2021 (CN) .......................... 202110978913.0

(51) Int. Cl.
*G02F 1/13357* (2006.01)
*G02F 1/1333* (2006.01)
(Continued)

(52) U.S. Cl.
CPC .. *G02F 1/133602* (2013.01); *G02F 1/133314* (2021.01); *G02F 1/13332* (2021.01);
(Continued)

(58) Field of Classification Search
CPC ......... G02F 1/133603; G02F 1/136209; G02F 1/133512
See application file for complete search history.

(56) References Cited

U.S. PATENT DOCUMENTS

2014/0267955 A1* 9/2014 Hibayashi ......... G02F 1/133514
349/12
2018/0039050 A1* 2/2018 Rose .................... H04N 13/243
(Continued)

FOREIGN PATENT DOCUMENTS

CN 108682299 A 10/2018
CN 108873438 A 11/2018
(Continued)

*Primary Examiner* — Kevin M Nguyen
(74) *Attorney, Agent, or Firm* — Nathan & Associates; Menachem Nathan (57) ABSTRACT

The present disclosure discloses a display panel and a display device. The display panel includes a backlight module and a panel body. The panel body includes a light-transmitting region. The backlight module includes: a backlight unit, provided with a light-transmitting portion corresponding to the light-transmitting region; and a light source assembly. The panel body includes: a substrate, located on the backlight unit; a metal wire, located on a side of the substrate opposite the backlight unit; and a shading layer, located between the substrate and the metal wire, the shading layer covering the metal wire.

19 Claims, 3 Drawing Sheets

(51) Int. Cl.
    *G02F 1/1335*     (2006.01)
    *G02F 1/1362*     (2006.01)

(52) U.S. Cl.
    CPC .. *G02F 1/133512* (2013.01); *G02F 1/133514* (2013.01); *G02F 1/136286* (2013.01)

(56) References Cited

U.S. PATENT DOCUMENTS

| | | |
|---|---|---|
| 2018/0203313 A1 | 7/2018 | Wang et al. |
| 2019/0384096 A1* | 12/2019 | Que ................ G02F 1/133514 |
| 2020/0050048 A1* | 2/2020 | Morioka ............... H04N 23/57 |
| 2021/0083227 A1 | 3/2021 | Her et al. |

FOREIGN PATENT DOCUMENTS

| | | | |
|---|---|---|---|
| CN | 108897174 | A | 11/2018 |
| CN | 109143704 | A | 1/2019 |
| CN | 109712996 | A | 5/2019 |
| CN | 110955084 | A | 4/2020 |
| CN | 111722431 | A | 9/2020 |
| CN | 111948850 | A | 11/2020 |
| CN | 112349731 | A | 2/2021 |
| JP | 2009145760 | A | 7/2009 |
| JP | 2018013698 | A | 1/2018 |

\* cited by examiner

DISPLAY PANEL AND DISPLAY DEVICE

FIELD OF INVENTION

The present disclosure relates to display technologies, and more particularly, to a display panel and a display device.

BACKGROUND OF INVENTION

With the development of liquid crystal display technologies, especially the development of full-screen technologies, nowadays, most manufacturers open a hole in a backlight module of a display device to correspondingly place an under-screen camera, and the under-screen camera is used to receive incident light from an external environment.

Figure 1:
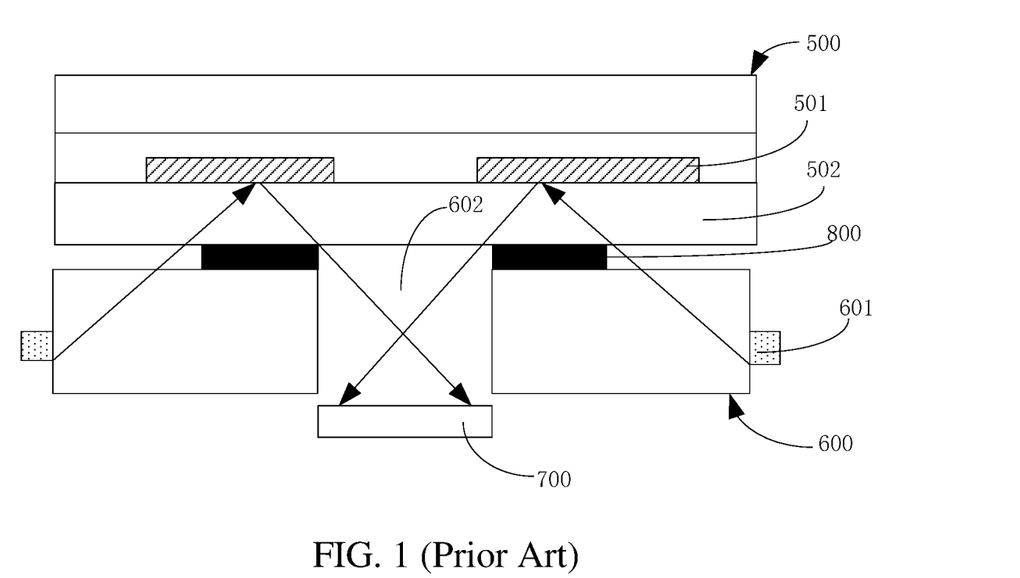
FIG. 1 is a schematic diagram of a structure of a display device in the prior art.

However, as shown in FIG. 1, a panel body 500 in a display panel is provided with a large number of metal wires 501. Light emitted by a backlight source 601 in a backlight module 600 to the metal wires 501 is reflected to an under-screen camera 700 through an open hole 602 in the backlight module 600, affecting a photographing effect of the under-screen camera 700. In the prior art, a shading adhesive tape 800 is laminated between the panel body 500 and the backlight module 600 to avoid reflection. However, a substrate 502 laminated to the shading adhesive tape 800 in the panel body 500 has a particular thickness. If the shading adhesive tape 800 is relatively narrow, the backlight source 601 still emits light to the metal wires 501 through the substrate 502 to cause reflection, affecting the photographing effect of the under-screen camera 700.

SUMMARY OF INVENTION

Embodiments of the present disclosure provide a display panel, so that a photographing effect at the bottom of a display panel can be improved.

Embodiments of the present disclosure provide a display panel, including a backlight module and a panel body located on the backlight module, the panel body including a light-transmitting region, wherein
  the backlight module includes:
  a backlight unit, provided with a light-transmitting portion corresponding to the light-transmitting region; and
  a light source assembly, configured to provide a light source to the panel body through the backlight unit; and
  the panel body includes:
  a substrate, located on the backlight unit;
  a metal wire, located on a side of the substrate opposite the backlight unit; and
  a shading layer, located between the substrate and the metal wire, the shading layer covering the metal wire.

Optionally, the panel body includes a color film base plate located on the backlight unit and an array base plate located on the color film base plate; and
  the color film base plate includes the substrate and the shading layer, and the array base plate includes the metal wire.

Optionally, the color film base plate further includes a plurality of color filters, and the shading layer includes a plurality of shading blocks; and
  each color filter is located between two corresponding shading blocks.

Optionally, the panel body further includes a display region located outside the light-transmitting region, and the display region includes a first sub-display region close to the light-transmitting region;

a density of shading blocks in the first sub-display region is greater than a density of shading blocks in the light-transmitting region.

Optionally, in a direction from the display region toward a center of the light-transmitting region, the density of the shading blocks in the light-transmitting region gradually decreases.

Optionally, a width of a shading block in the first sub-display region is greater than a width of a shading block in the light-transmitting region, and in the direction from the display region toward the center of the light-transmitting region, the width of the shading block in the light-transmitting region gradually decreases.

Optionally, the display region further includes a second sub-display region located outside the first sub-display region; and
  a density of shading blocks in the second sub-display region is less than the density of the shading blocks in the first sub-display region, and the density of the shading blocks in the second sub-display region is greater than or equal to the density of shading blocks in the light-transmitting region.

Optionally, the color filters in the light-transmitting region include a red color filter, a green color filter, a blue color filter, and a white color filter.

Optionally, a white color filter close to the display region in the light-transmitting region is at least partially covered by the shading blocks.

Optionally, the panel body includes an array base plate located on the backlight unit and a color film base plate located on the array base plate; and
  the array base plate includes the substrate, the shading layer, and the metal wire.

Optionally, an orthogonal projection of the shading layer onto the substrate completely overlaps an orthogonal projection of the metal wire onto the substrate.

Optionally, a material of the shading layer is black metal.

Optionally, a light reflecting layer covers a circumferential side of the light-transmitting portion.

Embodiments of the present disclosure further provide a display device, including a photographing assembly and a display panel, the display panel including a backlight module and a panel body located on the backlight module, the panel body including a light-transmitting region, wherein
  the backlight module includes:
  a backlight unit, provided with a light-transmitting portion corresponding to the light-transmitting region; and
  a light source assembly, configured to provide a light source to the panel body through the backlight unit; and
  the panel body includes:
  a substrate, located on the backlight unit;
  a metal wire, located on a side of the substrate opposite the backlight unit; and
  a shading layer, located between the substrate and the metal wire, the shading layer covering the metal wire, wherein
  the photographing assembly is located on a side of the backlight unit opposite the panel body, and corresponds to the light-transmitting portion.

Optionally, the panel body includes a color film base plate located on the backlight unit and an array base plate located on the color film base plate; and
  the color film base plate includes the substrate and the shading layer, and the array base plate includes the metal wire.

Optionally, the color film base plate further includes a plurality of color filters, and the shading layer includes a plurality of shading blocks; and each color filter is located between two corresponding shading blocks.

Optionally, the panel body further includes a display region located outside the light-transmitting region, and the display region includes a first sub-display region close to the light-transmitting region;

a density of shading blocks in the first sub-display region is greater than a density of shading blocks in the light-transmitting region; and in a direction from the display region toward a center of the light-transmitting region, the density of shading blocks in the light-transmitting region gradually decreases.

Optionally, the panel body includes an array base plate located on the backlight unit and a color film base plate located on the array base plate; and the array base plate includes the substrate, the shading layer, and the metal wire.

Optionally, an orthogonal projection of the shading layer onto the substrate completely overlaps an orthogonal projection of the metal wire onto the substrate.

The beneficial effects of the present disclosure are as follows: A shading layer is disposed between a substrate and a metal wire of a panel body, so that when a light source assembly provides a light source to the panel body through a backlight unit, a light beam entering the panel body is prevented from being reflected by the metal wire to the bottom of a display panel, thereby improving a photographing effect of a photographing assembly at the bottom of the display panel.

BRIEF DESCRIPTION OF DRAWINGS

The following describes specific implementations of the present disclosure in detail with reference to the accompanying drawings, to make the technical solutions and other beneficial effects of the present disclosure obvious.

DETAILED DESCRIPTION OF PREFERRED EMBODIMENTS

Specific structures and functional details disclosed herein are merely representative, and are intended to describe the objectives of the exemplary embodiments of the present disclosure. However, the present disclosure may be specifically implemented in many alternative forms, and should not be construed as being limited to the embodiments set forth herein.

In the description of the present disclosure, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, the terms "first" and "second" are used for descriptive purposes only and are not to be construed as indicating or implying relative importance or implicitly indicating the number of technical features indicated. Therefore, features defining "first" and "second" may explicitly or implicitly include one or more such features. In the description of the present disclosure, unless otherwise stated, "a plurality of" means two or more than two. In addition, the terms "include", "comprise" and any variant thereof are intended to cover non-exclusive inclusion.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

The terms used herein are for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, units, and/or components, but do not preclude the presence or addition of one or more other features, integers, steps, operations, units, components, and/or combinations thereof.

The present disclosure is further described below with reference to the accompanying drawings and embodiments.

Figure 2:
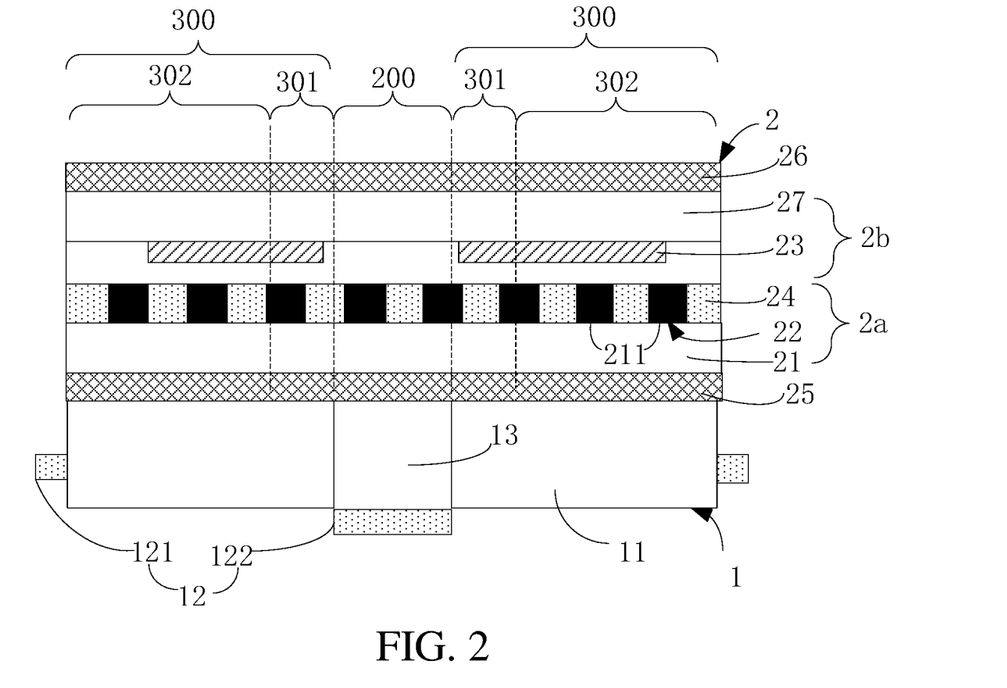
FIG. 2 is a schematic diagram of a structure of a display panel according to an embodiment of the present disclosure.

FIG. 2 is a schematic diagram of a structure of a display panel according to an embodiment of the present invention;

The display panel provided in embodiments of the present invention includes a backlight module 1 and a panel body 2. The panel body 2 is located on the backlight module 1.

The backlight module 1 includes a backlight unit 11 and a light source assembly 12. A light-transmitting portion 13 is provided in the backlight unit 11. The light-transmitting portion 13 penetrates the backlight unit 11. The light-transmitting portion 13 may be a backlight hole. That is, the backlight hole penetrates the backlight unit 11. The backlight hole may be filled with a light-transmitting material. The backlight hole 13 may be a circular hole. The light-transmitting material may be organic glass (PMMA). The panel body 2 includes a light-transmitting region 200. A position of the light-transmitting portion 13 corresponds to a position of the light-transmitting region 200. That is, an orthogonal projection of the light-transmitting portion 13 onto the panel body 2 completely overlaps the light-transmitting region 200. The light-transmitting region 200 and the light-transmitting portion 13 are disposed, so that the light transmittance of the display panel can be increased, to ensure that more external light enters the bottom (that is, a side of the backlight unit 11 opposite the panel body 2) of the display panel, thereby improving a photographing effect of a photographing assembly at the bottom of the display panel.

Figure 3:
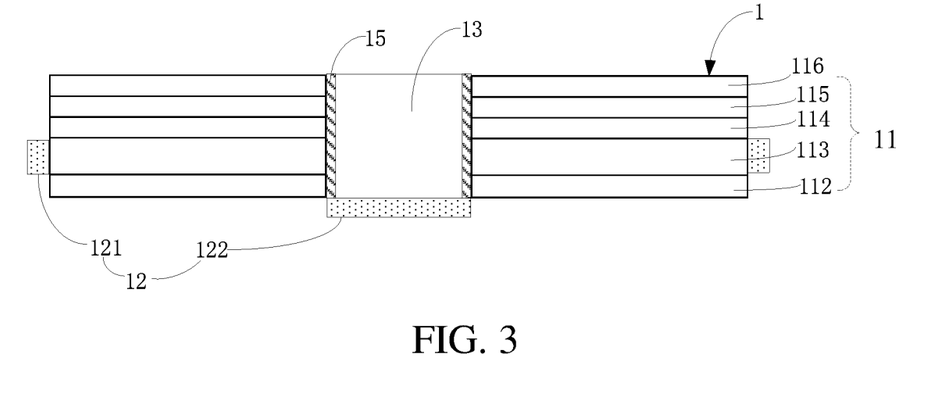
FIG. 3 is a schematic diagram of a structure of a backlight module in a display panel according to an embodiment of the present disclosure.

Specifically, as shown in FIG. 3, the backlight unit 11 may include a reflector plate 112, a light-guide plate 113, a diffusion plate 114, a bottom brightness enhancement plate 115, and a top brightness enhancement plate 116 that are sequentially disposed. The reflector plate 112 may be disposed on a back panel (not shown in the figure). The light-guide plate 113 is disposed on the reflector plate 112. The diffusion plate 114 is disposed on the light-guide plate 113. The bottom brightness enhancement plate 115 is disposed on the diffusion plate 114. The top brightness enhancement plate 116 is disposed on the bottom brightness enhancement plate 115. The panel body 2 may be disposed on the top brightness enhancement plate 116. The diffusion plate 114 is configured to diffuse light rays to provide a uniform surface light source. The bottom brightness enhancement plate 115 and the top brightness enhancement plate 116 are configured to enhance the brightness of the light source. The light-transmitting portion 13 sequentially penetrates the reflector plate 112, the light-guide plate 113, the diffusion plate 114, the bottom brightness enhancement plate 115, and the top brightness enhancement plate 116.

The light source assembly 12 is configured to provide a light source to the panel body 2 through the backlight unit 11. Specifically, the light source assembly 12 may include a first light source 121. The first light source 121 is located on a circumferential side of the backlight unit 11, and the first light source 121 may be disposed opposite the light-guide plate 113, to enable the first light source 121 to provide a uniform light source to the panel body 2 through the light-guide plate 113. However, because the light-transmitting portion 13 penetrates the light-guide plate 113, the first light source 121 cannot provide a light source to the light-transmitting region 200 corresponding to the light-transmitting portion 13, and the light-transmitting region 200 corresponding to the light-transmitting portion 13 cannot perform normal display. To ensure the normal display of the display panel, the light source assembly 12 may further include a second light source 122. The second light source 122 may be located on the side of the backlight unit 11 opposite the panel body 2, to enable the second light source 122 to provide a light source to the light-transmitting region 200 of the panel body 2 through the light-transmitting portion 13 in the backlight unit 11.

Specifically, a position of the second light source 122 may correspond to the position of the light-transmitting portion 13. That is, an orthogonal projection of the second light source 122 onto the backlight unit 11 is located in the light-transmitting portion 13. The second light source 122 may be a transparent light source, so that when the photographing assembly at the bottom of the display panel performs photographing, it is ensured that external light enters the bottom of the display panel through the second light source 122, and during normal display of the display panel, the second light source 122 provides a light source to the light-transmitting region 200 of the panel body 2 through the light-transmitting portion 13. The second light source 122 may be alternatively located on an outer side of the light-transmitting portion 13. That is, the orthogonal projection of the second light source 122 onto the backlight unit 11 is located outside the light-transmitting portion 13. A light-guide ring (not shown in the figure) is disposed between the second light source 122 and the backlight unit 11, so that a light beam emitted by the second light source 122 enters the light-transmitting portion 13 through the light-guide ring, to further enter the light-transmitting region 200 of the panel body 2 through the light-transmitting portion 13. In addition, the arrangement of the second light source 122 does not affect the reception of external light at the bottom of the display panel.

As shown in FIG. 2, the panel body 2 includes a substrate 21, a shading layer 22, and a metal wire 23. The substrate 21 is close to a side of the backlight unit 11. The shading layer 22 is located on a side of the substrate 21 opposite the backlight unit 11. The metal wire 23 is located on a side of the shading layer 22 opposite the substrate 21. That is, the substrate 21 is located between the backlight unit 11 and the shading layer 22. The shading layer 22 is located between the substrate 21 and the metal wire 23, and the shading layer 22 covers the metal wire 23. The substrate 21 may be a glass substrate. The metal wire 23 may be a data line, a signal line or the like. The material of the metal wire 23 may be molybdenum Mo, titanium Ti, aluminum Al or the like.

Because the reflectivity of the metal wire 23 is approximately 50%, a light beam emitted onto the metal wire 23 tends to be reflected to the bottom of the display panel through the light-transmitting portion 13, affecting the photographing effect of the photographing assembly at the bottom of the display panel. Therefore, in the present embodiment, the shading layer 22 is disposed between the substrate 21 and the metal wire 23 of the panel body 2. In a direction from the backlight module 1 to the panel body 2, the shading layer 22 covers the metal wire 23, so that a light beam entering the panel body 2 can be effectively prevented from being reflected to the bottom of the display panel through the metal wire 23, thereby improving the photographing effect of the photographing assembly at the bottom of the display panel. In addition, the shading layer 22 is located between the substrate 21 and the metal wire 23. That is, the shading layer 22 is close to the metal wire 23, so that a region covered by the shading layer 22 may be small enough, and the light beam can be prevented from being reflected to the bottom of the display panel through the metal wire 23, so that it is ensured that the display effect of the display panel is not affected by the shading layer 22.

The panel body 2 includes a color film base plate 2a and an array base plate 2b that are disposed opposite. The substrate 21, the shading layer 22, and the metal wire 23 are film layers in the color film base plate 2a and the array base plate 2b.

In an implementation, as shown in FIG. 2, the color film base plate 2a is located on the backlight unit 11. The array base plate 2b is located on the color film base plate 2a. That is, the color film base plate 2a is located between the backlight unit 11 and the array base plate 2b. The substrate 21 and the shading layer 22 are located in the color film base plate 2a. The metal wire 23 is located in the array base plate 2b. That is, the color film base plate 2a includes the substrate 21 and a shading layer 22. The substrate 21 is close to the side of the backlight unit 11. The shading layer 22 is located on the side of the substrate 21 opposite the backlight unit 11. The array base plate 2b includes the metal wire 23. The array base plate 2b may further include a substrate 27. The substrate 27 is located on a side of the metal wire 23 opposite the color film base plate 2a. The substrate 27 may be a glass substrate.

The color film base plate 2a further includes a plurality of color filters 24 disposed at intervals. The shading layer 22 includes a plurality of shading blocks 211. Each color filter 24 is located between two corresponding shading blocks 211. The shading block 211 may be a black matrix. In the present embodiment, the shading blocks 211 around the color filter 24 are used as the shading layer. It can be avoided that the shading layer is additionally added to the color film base plate 2a, so that the shading layer 22 can divide adjacent color filters 24 to prevent light leakage or color mixing and can prevent the light beam from being reflected to the bottom of the display panel through the metal wire 23.

According to a path of the light beam being reflected to the light-transmitting portion 13 through the metal wire 23, the distribution density of the shading blocks 211 can be adjusted. That is, the shading blocks 211 may have different distribution densities in different regions of the panel body 2.

Figure 4:
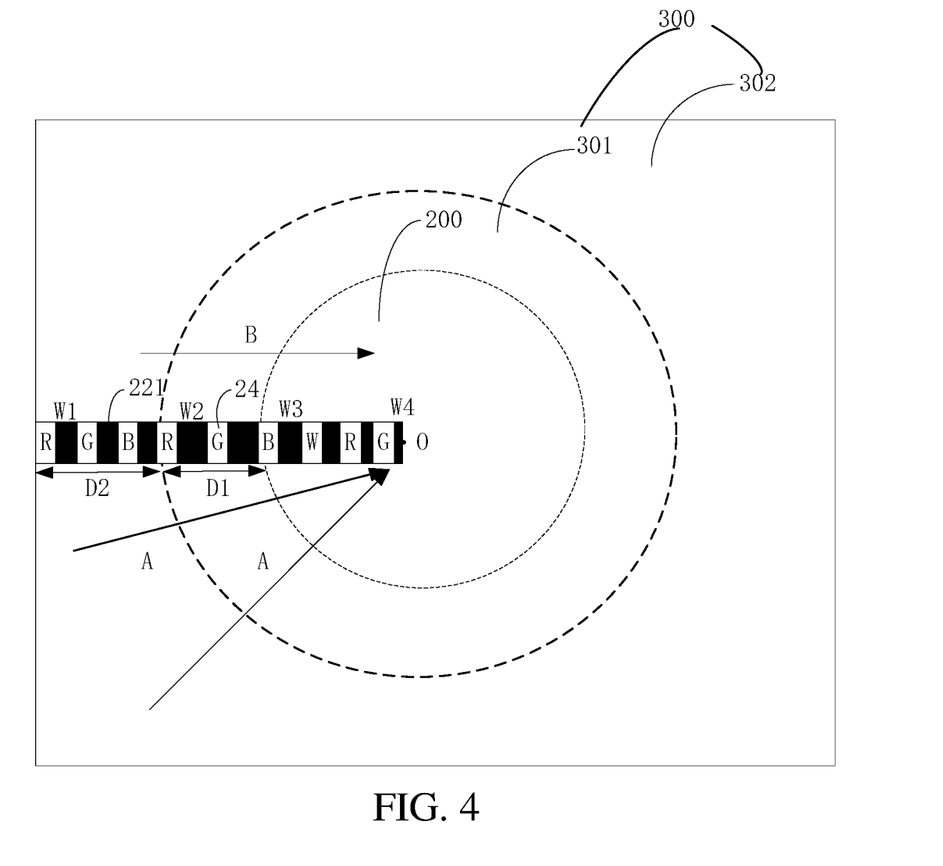
FIG. 4 is a structural diagram of the distribution of shading blocks and color filters in a display panel according to an embodiment of the present disclosure.

Specifically, the panel body 2 may further include a display region 300 located outside the light-transmitting region 200. That is, regions other than the light-transmitting region 200 may all be the display region 300. The display region 300 may include a first sub-display region 301 and a second sub-display region 302. The first sub-display region 301 is disposed close to the light-transmitting region 200, and the first sub-display region 301 is disposed surrounding the light-transmitting region 200. The second sub-display region 302 is located outside the first sub-display region 301. That is, display regions other than the first sub-display region 301 may all be the second sub-display region 302. As shown in FIG. 4, a length D1 of the first sub-display region 301 in a direction A toward a center O of the light-transmitting region 200 is less than a length D2 of the second sub-display region 302 in the direction A toward the center O of the light-transmitting region 200.

The light beam entering the panel body 2 through the first sub-display region 301 can be reflected by the metal wire 23 to the bottom of the display panel. Therefore, a density of shading blocks 221 in the first sub-display region 301 can be increased without affecting the display effect of the display panel, so that shading blocks 211 in the first sub-display region 301 have the largest density. That is, a density of the shading blocks 211 in the first sub-display region 301 is greater than a density of shading blocks 211 in the light-transmitting region 200, and the density of the shading blocks 211 in the first sub-display region 301 is greater than a density of shading blocks 211 in the second sub-display region 302, so that the light beam entering the panel body 2 through the first sub-display region 301 can be prevented from being emitted to the metal wire 23, thereby preventing the light beam from being reflected to the bottom of the display panel through the metal wire 23.

The density of the shading blocks 211 in the light-transmitting region 200 may be equal to the density of the shading blocks 211 in the second sub-display region 302, or the density of the shading blocks 211 in the light-transmitting region 200 may be less than the density of the shading blocks 211 in the second sub-display region 302, or a density of shading blocks 211 in a partial region of the light-transmitting region 200 is equal to the density of the shading blocks 211 in the second sub-display region 302, and a density of shading blocks 211 in another partial region of the light-transmitting region 201 is less than the density of the shading blocks 211 in the second sub-display region 302.

To further increase the light transmittance of the light-transmitting region 200, improve the photographing effect at the bottom of the display panel, and reduce the density of the shading blocks 211 in the light-transmitting region 200, the density of the shading blocks 211 in the light-transmitting region 200 is the smallest. That is, the density of the shading blocks 211 in the light-transmitting region 200 is less than a density of shading blocks in the second sub-display region 302.

Specifically, as shown in FIG. 4, in the direction A from the display region 300 toward the center O of the light-transmitting region 200, the density of the shading blocks 211 in the light-transmitting region 200 may gradually decrease. A density of the shading blocks 211 close to the display region 300 in the light-transmitting region 200 may be same as the density of the shading blocks 211 in the second sub-display region 302, and a density of shading blocks 211 located at the center O of the light-transmitting region 201 is the smallest. Alternatively, in the direction A from the display region 300 toward the center O of the light-transmitting region 201, the density of the shading blocks 211 in the first sub-display region 301 and the light-transmitting region 200 gradually decreases. That is, the shading blocks 211 located close to the second sub-display region 302 in the first sub-display region 301 have the largest density, and the density of the shading blocks 211 located at the center O of the light-transmitting region 200 is the smallest.

The varying densities of the shading blocks 211 may be implemented in a plurality of manners. For example, when a width (that is, a length of the shading block 211 in a direction B) of the shading block 211 does not change, a spacing between adjacent shading blocks 211 (that is, a length of the color filter 24 in the direction B) decreases, and the density of the shading blocks 211 increases; and the spacing between adjacent shading blocks 211 increases, and the density of the shading blocks 211 decreases. Alternatively, when the spacing between adjacent shading blocks 211 does not change, the width of the shading block 211 increases, and the density of the shading blocks 211 increases; and the width of the shading block 211 decreases, and the density of the shading blocks 211 decreases. Alternatively, when the spacing between adjacent shading blocks 211 and the width of the shading block 211 both change, the spacing between adjacent shading blocks 211 decreases, the width of the shading block 211 increases, and the density of the shading blocks 211 increases; and the spacing between adjacent shading blocks 211 increases, the width of the shading block 211 decreases, and the density of the shading blocks 211 decreases.

As shown in FIG. 4, the shading block 211 in the first sub-display region 301 has the largest width. In the direction from the display region 300 toward the center O of the light-transmitting region 201, the width of the shading block 211 in the light-transmitting region 200 gradually decreases, so that the density of the shading blocks 211 in the light-transmitting region 200 gradually decreases. Specifically, a width W2 of the shading block 211 located in the first sub-display region 301 is greater than a width W4 of the shading block 211 located at the center O of the light-transmitting region 200, a width W3 of the shading block 211 located therebetween (for example, located at an edge of the light-transmitting region 201) is less than W2 and is greater than W4. That is, W2>W3>W4. A width W1 of the shading block 211 in the second sub-display region 302 is greater than or equal to W4 and is less than W2. That is, W2>W1>W4.

To ensure that the display effect of the panel body 2 is not affected, a width of the first sub-display region 301 (that is, the length of the first sub-display region 301 in the direction A) requires to be as small as possible. The smallest width of the first sub-display region 301 is correlated to the thickness of the substrate 21, the spacing between the backlight module 1 and the substrate 21, and a light exit angle range of the light source assembly 12. It requires to be noted that, because another film layer is further provided between the backlight module 1 and the substrate 21, a spacing is provided between the backlight module 1 and the substrate 21.

Specifically, the smallest width of the first sub-display region 301 is directly proportional to the thickness of the substrate 21, the spacing between the backlight module 1 and the panel body 2, and the light exit angle range of the light source assembly 12. That is, when the thickness of the substrate 21 is larger, the smallest width of the first sub-display region 301 is larger. When the spacing between the backlight module 1 and the substrate 21 is larger, the smallest width of the first sub-display region 301 is larger. When the light exit angle range of the light source assembly 12 is larger, the smallest width of the first sub-display region 301 is larger. It requires to be noted that the light exit angle range of the light source assembly 12 is mainly a light exit angle range of the first light source 121 in the light source assembly 12. That is, when the light exit angle range of the first light source 121 is larger, the smallest width of the first sub-display region 301 is larger.

To further increase the light transmittance of the light-transmitting region 200 and improve the photographing effect of the photographing assembly at the bottom of the display panel, a white color filter W may be added to the light-transmitting region 200. That is, the color filter in the light-transmitting region 201 includes a red color filter R, a green color filter G, a blue color filter B, and the white color filter W, as shown in FIG. 4. The color filters in the first sub-display region 301 and the second sub-display region 302 may include only a red color filter R, a green color filter G, and a blue color filter B. It requires to be noted that, the white color filter W close to the display region 300 in the light-transmitting region 200 may be at least partially covered by the shading blocks 211, thereby reducing a pixel aperture ratio, and in addition, the density of shading blocks 211 close to the display region 300 in the light-transmitting region 201 is ensured.

Figure 5:
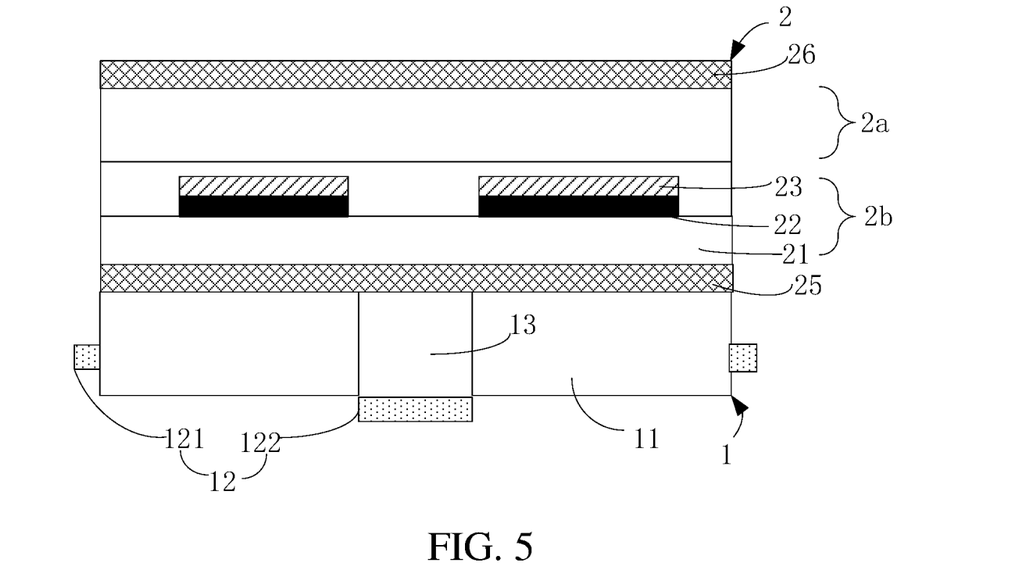
FIG. 5 is a schematic diagram of a structure of another display panel according to an embodiment of the present disclosure.

In another implementation, as shown in FIG. 5, the array base plate 2b is located on the backlight unit 11. The color film base plate 2a is located on the array base plate 2b. That is, the array base plate 2b is located between the backlight unit 11 and the color film base plate 2a. The substrate 21, the shading layer 22, and the metal wire 23 are all located in the color film base plate 2a. That is, the array base plate 2b includes the substrate 21, the shading layer 22, and the metal wire 23. The substrate 21 is close to the side of the backlight unit 11. The shading layer 22 is located on the side of the substrate 21 opposite the backlight unit 11. The metal wire 23 is located on the side of the shading layer 22 opposite the substrate 21. The color film base plate 2a may include a plurality of color filters (not shown in the figure) and a plurality of shading blocks (not shown in the figure). Each color filter is located between two shading blocks corresponding to the color filters.

The shading layer 22 covers a side of the metal wire 23 close to the substrate 21. To ensure that the display effect of the display panel is not affected, the region covered by the shading layer 22 requires to be as small as possible. An orthogonal projection of the shading layer 22 onto the substrate 21 completely overlaps an orthogonal projection of the metal wire 23 onto the substrate 21, so that while it is ensured that the display effect of the display panel 2 is not affected by the shading layer 22, a light beam is prevented from being reflected to the bottom of the display panel through the metal wire 23, thereby improving the photographing effect of the photographing assembly at the bottom of the display panel.

A material of the shading layer 22 is black metal. For example, the metal wire 23 is molybdenum Mo, and the shading layer 22 may be made of molybdenum oxide $MoO_x$. The low reflection performance of oxide molybdenum $MoO_x$ is utilized, so that a light beam can be effectively prevented from being emitted to the metal wire 23 and further prevented from being reflected to the bottom of the display panel.

As shown in FIG. 3, the backlight module 1 may further include a light reflecting layer 15. The light reflecting layer 15 is located on a circumferential side of the light-transmitting portion 13. That is, the light reflecting layer 15 covers a sidewall of the light-transmitting portion 13. The light reflecting layer 15 may be a metal film with high reflection performance. For example, a material of the light reflecting layer 15 may be aluminum.

Because the first light source 121 in the light source assembly 12 is located on the circumferential side of the backlight unit 11, and the light-transmitting portion 13 penetrates the backlight unit 11, that is, the first light source 121 is located on the circumferential side of the light-transmitting portion 13, a light beam emitted by the first light source 121 may enter the bottom of the display panel through the side of the light-transmitting portion 13, affecting the photographing effect at the bottom of the display panel. Therefore, in the present embodiment, the sidewall of the light-transmitting portion 13 covers the light reflecting layer 15, so that the light beam emitted by the first light source 121 to the side of the light-transmitting portion 13 can be reflected back, thereby effectively preventing the light beam emitted by the first light source 121 from entering the bottom of the display panel through the side of the light-transmitting portion 13, thereby improving the photographing effect at the bottom of the display panel.

In addition, because the light reflecting layer 15 is applied on the sidewall of the light-transmitting portion 13, the thickness of the light reflecting layer 15 may be very small while a high reflection effect can be achieved. Therefore, a light barrier film no longer requires to be disposed in the backlight unit 11 (a backlight unit in the prior art includes a light barrier film located on a circumferential side of the backlight hole, the light barrier film has a relatively large thickness and does not guide light to the panel body, and the display in a panel body region corresponding to the light barrier film is affected), to prevent the light barrier film from affecting the display in the panel body region corresponding to the light barrier film, and the light reflecting layer 15 is very thin, and the panel body region affected by the light reflecting layer 15 is omittable, thereby improving the display effect of the panel body 2.

Further, as shown in FIGS. 2 and 5, the panel body 2 may further include a bottom polarizer 25 and a top polarizer 26. The bottom polarizer 25 is located between the backlight unit 11 and the substrate 21. The top polarizer 26 is located on a side of the metal wire 23 opposite the substrate 21. When the color film base plate 2a of the panel body 2 is close to a side of the backlight unit 11, that is, when the color film base plate 2a is located between the backlight unit 11 and the array base plate 2b, the bottom polarizer 25 is located between the backlight unit 11 and the color film base plate 2a, and the top polarizer 26 is located on a side of the array base plate 2b opposite the color film base plate 2a. When the array base plate 2b of the panel body 2 is close to the side of the backlight unit 11, that is, when the array base plate 2b is located between the backlight unit 11 and the color film base plate 2a, the bottom polarizer 25 is located between the backlight unit 11 and the array base plate 2b, and the top polarizer 26 is located on a side of the color film base plate 2a opposite the array base plate 2b.

A through hole (not shown in the figure) may further be provided in each of the bottom polarizer 25 and the top polarizer 26, and positions of the through holes correspond to the position of the backlight hole 13. The arrangement of the through holes can further improve the light transmittance of the panel body 2, thereby improving the photographing effect at the bottom of the display panel.

In the embodiments of the present disclosure, a shading layer is disposed between a substrate and a metal wire of a panel body, so that when a light source assembly provides a light source to the panel body through a backlight unit, a light beam entering the panel body is prevented from being reflected by the metal wire to the bottom of a display panel, thereby improving a photographing effect at the bottom of the display panel.

Correspondingly, an embodiment of the present invention further provides a display device.

Figure 6:
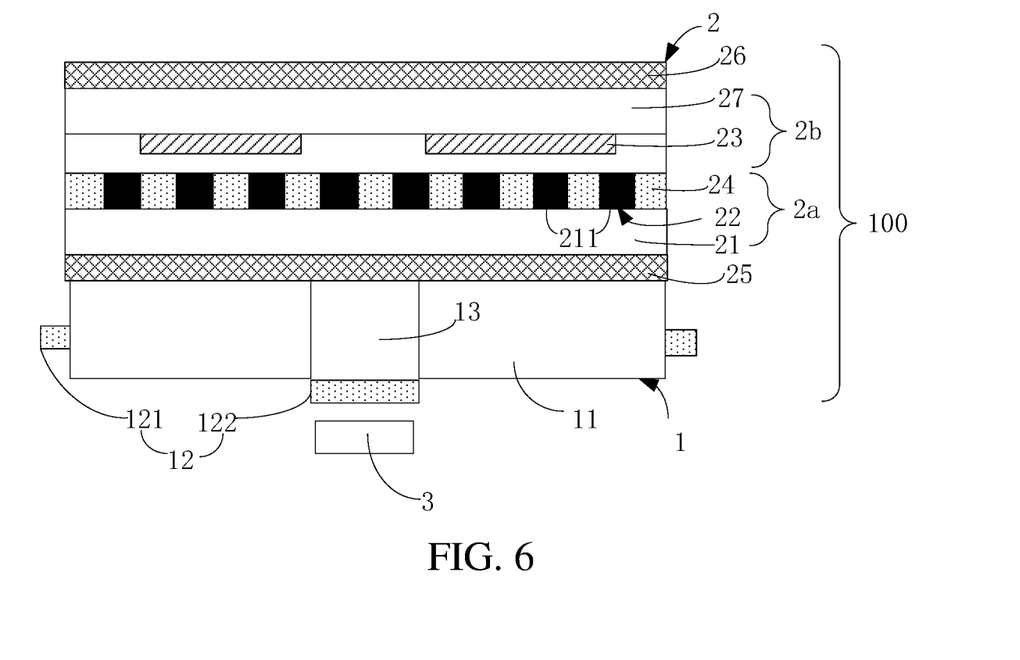
FIG. 6 is a schematic diagram of a structure of a display device according to an embodiment of the present disclosure.

As shown in FIG. 6, the display device provided in the embodiments of the present invention include a photographing assembly 3 and a display panel 100. The display panel 100 is the display panel in the foregoing embodiments. Details are not described herein again.

The photographing assembly 3 is located on a side of the backlight unit 11 opposite the panel body 2, and corresponds to the light-transmitting portion 13. That is, an orthogonal projection of the photographing assembly 3 onto the backlight unit 11 is located in the light-transmitting portion 13. When a camera in the photographing assembly 3 is turned on, the second light source 122 may be turned off, to ensure that a photodetector of the photographing assembly 3 can receive external light, thereby ensuring the normal photographing of the photographing assembly. When the camera in the photographing assembly 3 is not turned on, the second light source 122 may be turned on, to ensure the normal display of the display panel.

The display device in the present embodiment may be a mobile phone, a tablet computer, a television, a display, a notebook computer, a digital photo frame, a navigator, or any other product or component with a display function.

In summary, in the embodiments of the present disclosure, a shading layer is disposed between a substrate and a metal wire of a panel body, so that when a light source assembly provides a light source to the panel body through a backlight unit, a light beam entering the panel body is prevented from being reflected by the metal wire to the bottom of a display panel, thereby improving a photographing effect of a photographing assembly at the bottom of the display panel.

In conclusion, the present disclosure has been disclosed above through preferred embodiments. However, the preferred embodiments are not intended to limit the present disclosure, and a person of ordinary skill in the art can make various modifications and improvements without departing from the spirit and scope of the present disclosure. Therefore, the protection scope of the present disclosure should be subject to the scope defined by the claims.

What is claimed is:

1. A display panel, comprising a backlight module and a panel body located on the backlight module, wherein the panel body comprises a light-transmitting region and a display region located outside the light-transmitting region, and the display region comprises a first sub-display region disposed close to the light-transmitting region, and
   wherein the backlight module comprises:
     a backlight unit provided with a light-transmitting portion corresponding to the light-transmitting region; and
     a light source assembly configured to provide a light source to the panel body through the backlight unit; and
   wherein the panel body comprises:
     a substrate located on the backlight unit;
     a metal wire located on a side of the substrate away from the backlight unit; and
     a shading layer located between the substrate and the metal wire, wherein the shading layer covers the metal wire, the shading layer comprises a plurality of shading blocks, and a density of shading blocks in the first sub-display region is greater than a density of shading blocks in the light-transmitting region.

2. The display panel as claimed in claim 1, wherein the panel body further comprises a color film base plate located on the backlight unit and an array base plate located on the color film base plate; and
   wherein the color film base plate comprises the substrate and the shading layer, and the array base plate comprises the metal wire.

3. The display panel as claimed in claim 2, wherein the color film base plate further comprises a plurality of color filters; and
   wherein each color filter is located between two corresponding shading blocks.

4. The display panel as claimed in claim 1, wherein in a direction from the display region toward a center of the light-transmitting region, the density of the shading blocks in the light-transmitting region gradually decreases.

5. The display panel as claimed in claim 4, wherein a width of a shading block in the first sub-display region is greater than a width of a shading block in the light-transmitting region, and in the direction from the display region toward the center of the light-transmitting region, the width of the shading block in the light-transmitting region gradually decreases.

6. The display panel as claimed in claim 1, wherein the display region further comprises a second sub-display region located outside the first sub-display region; and
   wherein a density of shading blocks in the second sub-display region is less than the density of the shading blocks in the first sub-display region, and the density of the shading blocks in the second sub-display region is greater than or equal to the density of shading blocks in the light-transmitting region.

7. The display panel as claimed in claim 6, wherein a length of the first sub-display region in a direction toward a center of the light-transmitting region is less than a length of the second sub-display region in the direction toward the center of the light-transmitting region.

8. The display panel as claimed in claim 1, wherein the color filters in the light-transmitting region comprise a red color filter, a green color filter, a blue color filter, and a white color filter.

9. The display panel as claimed in claim 8, wherein the white color filter disposed close to the display region in the light-transmitting region is at least partially covered by the shading blocks.

10. The display panel as claimed in claim 1, wherein the panel body comprises an array base plate located on the backlight unit and a color film base plate located on the array base plate; and wherein the array base plate comprises the substrate, the shading layer, and the metal wire.

11. The display panel as claimed in claim 10, wherein an orthogonal projection of the shading layer onto the substrate completely matches an orthogonal projection of the metal wire onto the substrate.

12. The display panel as claimed in claim 10, wherein a material of the shading layer is black metal.

13. The display panel as claimed in claim 1, wherein a light reflecting layer covers a circumferential side of the light-transmitting portion.

14. A display device, comprising a photographing assembly and a display panel, wherein the display panel comprises a backlight module and a panel body located on the backlight module, the panel body comprises a light-transmitting region and a display region located outside the light-transmitting region, and the display region comprises a first sub-display region disposed close to the light-transmitting region, and wherein the backlight module comprises:
a backlight unit provided with a light-transmitting portion corresponding to the light-transmitting region; and
a light source assembly configured to provide a light source to the panel body through the backlight unit;
wherein the panel body comprises:
a substrate located on the backlight unit;
a metal wire located on a side of the substrate away from the backlight unit; and
a shading layer located between the substrate and the metal wire, wherein the shading layer covers the metal wire, and
wherein the photographing assembly is located on a side of the backlight unit away from the panel body, and corresponds to the light-transmitting portion, the shading layer comprises a plurality of shading blocks, and a density of shading blocks in the first sub-display region is greater than a density of shading blocks in the light-transmitting region.

15. The display device as claimed in claim 14, wherein the panel body further comprises a color film base plate located on the backlight unit and an array base plate located on the color film base plate; and wherein the color film base plate comprises the substrate and the shading layer, and the array base plate comprises the metal wire.

16. The display device as claimed in claim 15, wherein the color film base plate further comprises a plurality of color filters; and wherein each color filter is located between two corresponding shading blocks.

17. The display device as claimed in claim 16, wherein in a direction from the display region toward a center of the light-transmitting region, the density of the shading blocks in the light-transmitting region gradually decreases.

18. The display device as claimed in claim 14, wherein the panel body comprises an array base plate located on the backlight unit and a color film base plate located on the array base plate; and wherein the array base plate comprises the substrate, the shading layer, and the metal wire.

19. The display device as claimed in claim 18, wherein an orthogonal projection of the shading layer onto the substrate completely matches an orthogonal projection of the metal wire onto the substrate.

* * * * *